(12) United States Patent
Peker

(10) Patent No.: US 7,796,860 B2
(45) Date of Patent: Sep. 14, 2010

(54) METHOD AND SYSTEM FOR PLAYING BACK VIDEOS AT SPEEDS ADAPTED TO CONTENT

(75) Inventor: Kadir A. Peker, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1234 days.

(21) Appl. No.: 11/360,253

(22) Filed: Feb. 23, 2006

(65) Prior Publication Data

US 2007/0201817 A1  Aug. 30, 2007

(51) Int. Cl.
*H04N 5/91* (2006.01)
(52) U.S. Cl. .......................... 386/68; 375/240
(58) Field of Classification Search ............... 386/68; 375/240
See application file for complete search history.

(56) References Cited

U.S. PATENT DOCUMENTS

| 7,058,278 | B2 * | 6/2006 | Murabayashi | 386/46 |
| 2002/0090207 | A1 * | 7/2002 | Mishima et al. | 386/111 |
| 2002/0110358 | A1 | 8/2002 | Green | |
| 2004/0062520 | A1 * | 4/2004 | Gutta et al. | 386/46 |
| 2008/0186381 | A1 * | 8/2008 | Guo et al. | 348/143 |

FOREIGN PATENT DOCUMENTS

| EP | 1168840 | 1/2002 |
| EP | 1174879 | 1/2002 |
| EP | 1182584 | 2/2002 |
| WO | WO 2005/001836 | 1/2005 |

OTHER PUBLICATIONS

Wang, J.R. and Parameswaran, N. (2004). "Survey of Sports Video Analysis: Research Issues and Applications." In Proc. 2003 Pan-Sydney Area Workshop on Visual Information Processing (VIP2003), Sydney, Australia. CRPIT, 36. Piccardi, M., Hintz, T., He, S., Huang, M. L. and Feng, D. D., Eds., ACS. 87-90.

(Continued)

*Primary Examiner*—Marsha D Banks Harold
*Assistant Examiner*—Daniel Tekle
(74) *Attorney, Agent, or Firm*—Dirk Brinkman; Gene Vinokur

(57) ABSTRACT

A method plays back a video at speeds adapted to content of the video. A video is partitioned into summary segments and skipped segments. The summary segments are played back sequentially at a normal play back speed, and the skipped segments are played back at varying speeds corresponding to a visual complexity of the skipped segments.

9 Claims, 1 Drawing Sheet

OTHER PUBLICATIONS

Peker, K.A.; Divakaran, A., "Adaptive Fast Playback-Based Video Skimming Using a Compressed-Domain Visual Complexity Measure", *IEEE International Conference on Multimedia and Expo (ICME)*, Jun. 2004.

Peker, K.A.; Divakaran, A., "An Extended Framework for Adaptive Playback-Based Video Summarization", *SPIE Internet Multimedia Management Systems IV*, vol. 5242, pp. 26-33, Sep. 2003.

Radhakrishan, R.; Xiong, Z.; Divakaran, A.; Ishikawa, Y., "Generation of Sports Highlights Using a Combination of Supervised & Unsupervised Learning in Audio Domain", *International Conference on Pacific Rim Conference on Multimedia*, vol. 2, pp. 935-939, Dec. 2003.

Yu-Fei Ma, Xian-Sheng Hua, Lie Lu, Hong-Jiang Zhang, "User Attention Model based Video Summarization," to appear in IEEE Transactions on Multimedia.

P. Viola and M. Jones, "Robust real-time object detection," IEEE Workshop on Statistical and Computational Theories of Vision. 2001.

T.S. Chua, S.F. Chang, L. Chaisorn, W. Hsu, "Story Boundary Detection in Large Broadcast Video Archives—Techniques, Experience and Trends," ACM Multimedia Conference, 2004.

* cited by examiner

METHOD AND SYSTEM FOR PLAYING BACK VIDEOS AT SPEEDS ADAPTED TO CONTENT

FIELD OF THE INVENTION

This invention relates generally to playing back recorded videos, and more particularly to playing back videos at varying speeds.

BACKGROUND OF THE INVENTION

A large volume of videos is available to consumers from personal video recorders (PVR) recordings, commercial DVDs, digitized home videos, the Internet, and other sources. A number of techniques are known for managing, browsing, and playing back videos. One common technique provides a summary for a video, "Video Mining, Series: The Kluwer International Series in Video Computing," Vol. 6, A. Rosenfeld, D. Doermann and D. DeMenthon (Eds.), ISBN 1-4020-7549-9, July 2003; J. R. Wang and N. Parameswaran, "Survey of Sports Video Analysis: Research Issues and Applications," Proc. 2003 Pan-Sydney Area Workshop on Visual Information Processing (VIP2003), CRPIT, 36, M. Piccardi, T. Hintz, S. He, M. L. Huang and D. D. Feng, Eds., ACS. 87-90, 2003; Cabbasson et al., "Summarizing Videos Using Motion Activity Descriptors Correlated with Audio Features," U.S. Pat. No. 6,956,904; Xiong et al., "Identifying Video Highlights Using Audio-Visual Objects," U.S. patent application Ser. No. 10/928,829, filed Aug. 27, 2004; Radhakrishnan et al., "Multimedia Event Detection and Summarization," U.S. patent application Ser. No. 10/840,824, filed May 7, 2004; and Divakaran et al., "Method for Summarizing a Video Using Motion Descriptors," U.S. patent application Ser. No. 09/845,009, filed Apr. 27, 2001.

The two basic methods are either based on storyboard style key-frame summaries or video summaries constructed from selected segments of a video. One disadvantage of playing back a video summary based on selected segments is a loss of continuity in the flow of the program. This may be more important for some content than others. Another disadvantage is a possibility of missing some important part in the video that was not included in the video summary.

SUMMARY OF THE INVENTION

The embodiments of the invention provide a method for playing back a video at varying speeds that correspond to an interest level and visual complexity of the video content. The video includes a visual signal, i.e., a sequence of frames and a synchronized audio signal. The interest level depends on face related features, such as the number, sizes and locations of faces in the frames. The interest level can also consider a classification of the audio signal of the video. The visual complexity depends on motion activity and texture of the visual signal.

DETAILED DESCRIPTION OF THE PREFERRED EMBODIMENTS

Figure 1:
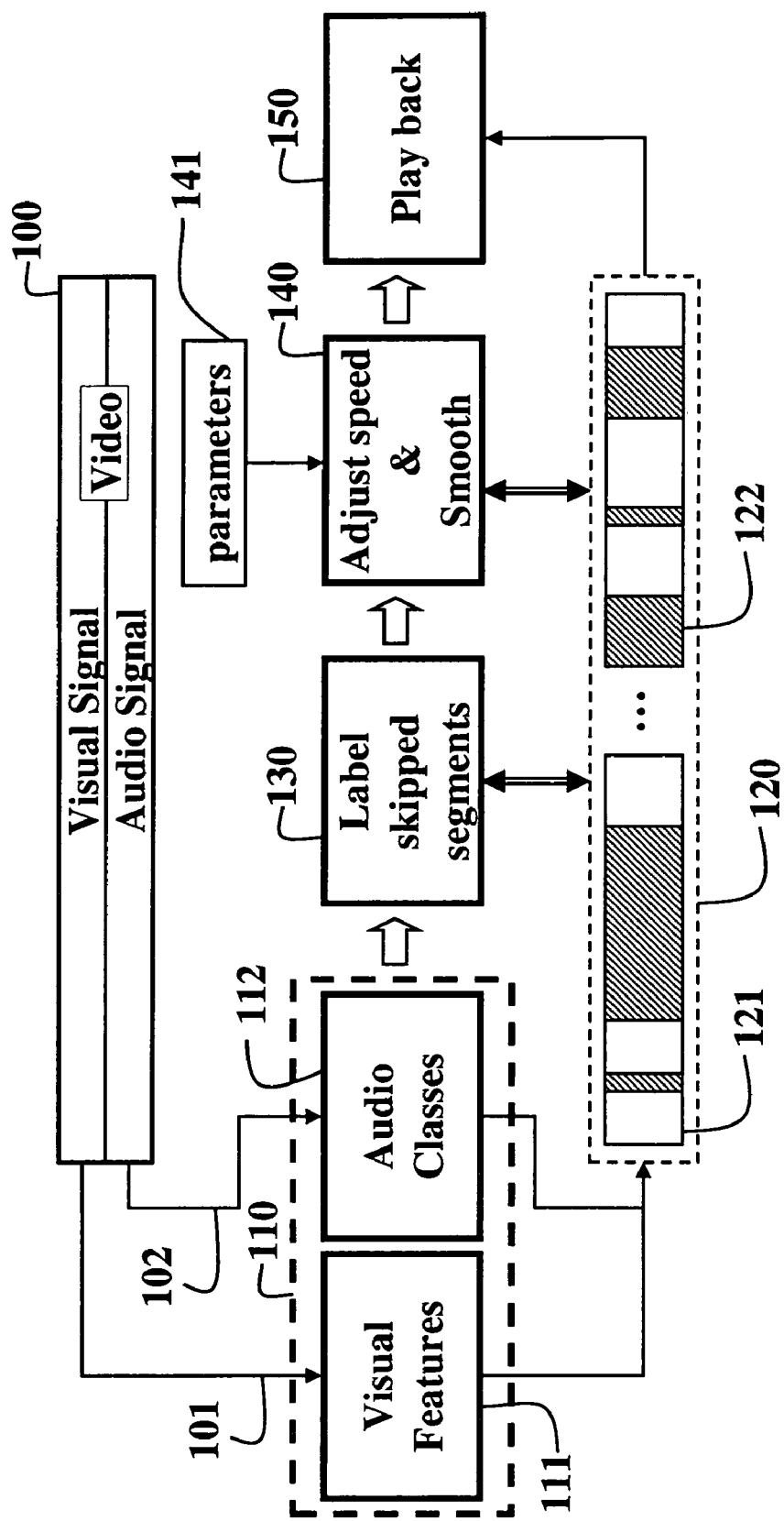
FIG. 1 is a flow diagram for adaptively playing back a video according to embodiments of the invention.

As shown in FIG. 1, our invention provides a method for playing back a video 100 at varying speeds adapted to the content of the video. The video includes a visual signal 101 in the form of a sequence of frames, and a synchronized audio signal 102. In a preferred embodiment, the video is compressed according to an MPEG standard. Therefore, the visual signal 101 includes I-frames and P-frames.

The video 100 is partitioned 110 into segments 120. The partitioning 110 uses visual feature detection 111 and audio classification 112. The partitioned segments 120 include 'summary' segments 121 of interesting parts of the video, and 'skipped' segments 122, shown hashed, of uninteresting parts. The skipped segments will generally be played back at a faster speed. The segments are identified by either the starting and ending frame numbers, or starting and ending times with respect to the beginning of the video.

The skipped segments are labeled 130 according to a visual complexity of the skipped segments. We determine the visual complexity for each group of frames (GOP) in the MPEG compressed video, using texture information from the I-frames and motion activity information from the P-frames. We use this measure as an indicator as to how fast the human visual system can follow the action in the video during play back. If there is a lot of action or image detail, it takes the visual system more time to process and comprehend the action, and vice versa. Hence, we allocate the playback time in proportion to the visual complexity of the video segments, i.e., the motion activity and level of detail as indicated by texture.

The segmented video 121 can then be played back 150 so that the summary segments 121 are played back at a normal speed, and the skipped segments are played back at a speed corresponding to the complexity level. For example, the play back speed of the skipped segments is slow when the visual complexity is high, and fast when the visual complexity is low. That is, the play back is adaptive to the content of the video.

In optional step, the play back speed for the various segments can be adjusted and quantized 140 according to user and play back device parameters 141. In addition, smoothing can be applied to the segmented video 120 to merge segments that are shorter than a threshold with an adjacent segment. The user can specify an optional total play back time parameter, which controls the segmentation and labeling.

Visual Features

We use faces for the visual features. Faces form an important visual class that enables analysis of a wide variety of video genres. We use a face detector as described in Viola et al., "System and Method for Detecting Objects in Images," U.S. patent application Ser. No. 10/200,464, filed Jul. 22, 2002 and allowed on Jan. 4, 2006, incorporated herein by reference.

That detector provides high accuracy and high speed, and can easily accommodate detection of objects other than faces depending on a parameter file used. Thus, the same detector can be used to detect several classes of objects. Specifically, our visual features include the number, sizes, and locations of faces in frames.

Audio Classes

Our audio classification uses Gaussian mixture models (GMM) to classify a number of audio classes, e.g., speech, music, excited speech, applause, cheering, etc., as described in Radhakrishnan et al., "Method for Classifying Data Samples with Mixture Models," U.S. patent application Ser. No. 11/336,473, filed Jan. 20, 2006; and Otsuka et al., "Enhanced Classification Using Training Data Refinement and Classifier Updating," U.S. patent application Ser. No. 11/028,970, filed Jan. 4, 2005, incorporated herein by reference.

By combining the visual features and the audio classes, our method can operate on a variety of different video types. For example, we use face size and detected speech to identify interesting segments. These segments are where there is a clear focus on speaker(s), indicated by the face sizes, and a significant duration of speech. We can use this approach to find story units in a news video, interviews in documentary or commentary programs, and dramatic dialog scenes in other types of video content.

Visual Complexity and Adaptive Play Back

A fastest speed at which a video can be played back with acceptable comprehension of its content is a function of a number of factors including scene complexity, semantic elements in the scene, familiarity of those elements, and the processing capacity of the human visual system. However, it is very difficult to model the semantic and the memory aspects of human vision.

Our visual complexity is based on the intensity of motion activity and the level of detail in a given video segment. A compressed domain extraction method using MPEG motion vectors and DCT coefficients is described in Peker et al., "Visual Complexity Measure for Playing Videos Adaptively," U.S. patent application Ser. No. 10/616,546, filed Jul. 10, 2003, incorporated herein by reference.

Adjusting Play Back Speed

A total playback duration under a variable playback speed is given as follows:

$$T_{play} = \sum_{i=1}^{N} \frac{T_i}{r_i},$$

where $T_i$ are the segment durations, $r_i$ are playback speeds; r=1 corresponds to normal playback speed and r>1 corresponds to fast playback. There are N video segments for a total duration $T_{media}$ of the video. Here the speeds $r_i$ for the skipped segments depend on a level of motion activity and visual complexity, and take on real values. However, the playback speed can take a predefined set of values for practical video play back devices. Furthermore, the adaptive playback speeds are only relative speeds, and can be scaled and/or shifted based on preferred overall speed, total play back time, or allowed minimum/maximum speeds.

We define a base speed $R_0$ and a speed spread $R_d$ for the skipped segments, based on user preferences. We define $R_{min}=R_0-R_d$ and $R_{max}=R_0+R_d$ as the minimum and maximum play back speeds, both of which are within physical limitations of the video play back device. The adaptive speed values are given as:

$$r'_i = (r_i - r_{min}) \frac{R_{max} - R_{min}}{r_{max} - r_{min}} + R_{min},$$

where $r_{min}$ and $r_{max}$ are the minimum and maximum values of the speed $r_i$. A final average speed is not guaranteed to be $R_0$. However, the final average speed is between $R_{min}$ and $R_{max}$.

After the playback speed limits are adjusted to user preferred and physically available limits, the speeds $r_i$ are quantized to a closest allowed speed value determined by the play back device.

Temporal Filtering for Smoothing

Both the face detection 111 and the audio classification 112 sometimes generate overly fragmented video summaries. There can be many very short summary segments and many very short skipped segments. The short segments result in jerky or jumpy video playback.

To alleviate this problem, summary segments with false face detections are relabeled as skipped segments using temporal coherence. We also 'smooth' the play back morphologically. Segments in the summary that are shorter than a threshold are merged with adjacent segments. Merging segments that are shorter than one to three seconds yields reasonable results.

Instead of using a fixed threshold, the threshold can be based on total playback time using the suggested fast play speed, rather than the duration of the segments. In this case, a higher duration threshold is applied to the segments that are played back at a faster speed compared to the segments played back at normal speed, such that the playback duration is long enough to avoid jumpiness, even at the fast playback speed. In this case, the playback duration threshold for each segment, based on the playback speed of that segment, is:

τ: Playback duration threshold $$T_{k,min} = \tau \cdot R_k$$

where $T_{k,min}$ is a minimum allowed length of a segment, $S_k$, in the video for a designated playback speed $R_k$. Segments are processed sequentially. If a segment $S_k$ is shorter than a corresponding length $T_{min}$, then we look at previous ($S_{k-1}$) segments and the next ($S_{k+1}$) segments. The short segment is merged with the adjacent segment closest in speed. If the speeds of the segments are identical, then the short segment is merged with the following segment.

EFFECT OF THE INVENTION

The invention provides a method for playing back a video at varying speeds adapted to the content. Segments that are designated as interesting are played back at normal speed, while other uninteresting segments of the video are played back at a higher speed, e.g., at a fast forward speed.

This is in contrast with conventional play back of summaries, where segments that are not part of the summary are completely skipped during play back. Fast forwarding through skipped segments, as described herein, allows for a tradeoff between play back duration and accuracy. This enables the user to see, at a minimal time cost, the entire video. This also provides a visual continuity between the various segments. The fast forward speed is set to allow a general visual perception of the overall activity that is taking place in the skipped segments.

Furthermore, the play back speed is adaptive and based on the visual complexity of the underlying content. Hence, low activity segments can be played back faster, and a slower speed is used for visually complex segments so that the user is better able to follow the visual presentation.

We also present methods of generating video summaries using both face features and audio classification. These techniques are effective over a wide range of video types including sports, news, drama, etc.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for playing back a video at speeds adapted to content of the video, comprising the steps of:
   partitioning a video into summary segments and skipped segments;
   playing back sequentially the summary segments at a normal play back speed;
   merging segments shorter than a threshold with adjacent segments, wherein the threshold is based on a total play back time; and
   playing back the skipped segments at varying speeds corresponding to a visual complexity of the skipped segments, in which a total playback time is $$T_{play} = \sum_{i=1}^{N} \frac{T_i}{r_i},$$

where $T_i$ are durations of the segments, $r_i$ are playback speeds with r=1 corresponding to normal play back speed and r>1 corresponding to a faster play back speed, and N is a number segments for a total duration $T_{media}$ of the video.

2. The method of claim 1, in which the video includes a visual signal as a sequence of frames, and an audio signal, and further comprising:
   detecting face features in the visual signal;
   identifying audio classes in the audio signal; and
   combining the face features and the audio classes to perform the partitioning.

3. The method of claim 1, in which the video is compressed and includes I-frames and P-frames.

4. The method of claim 3, in which the visual complexity is based on texture information from the I-frames and motion activity information from the P-frames.

5. The method of claim 1, in which the varying speeds are relatively slow when the visual complexity is relatively high, and relatively fast when the visual complexity is relatively low.

6. The method of claim 1, further comprising:
   adjusting the varying speeds according to user parameters, play back device parameters, and a total play back time.

7. The method of claim 1, further comprising:
   quantizing the varying speeds.

8. The method of claim 2, in which the face features include a number, size and location of faces in the frames.

9. The method of claim 1, in which a base speed is $R_0$ and a speed spread is $R_d$ for the skipped segments, based on user preferences, and $R_{min}=R_0-R_d$ and $R_{max}=R_0+R_d$ are defined as minimum and maximum play back speeds, and the varying speeds are $$r'_i = (r_i - r_{min}) \frac{R_{max} - R_{min}}{r_{max} - r_{min}} + R_{min},$$

where $r_{min}$ and $r_{max}$ are the minimum and maximum values of the speed $r_i$.

* * * * *